United States Patent
Dobron (12)

(10) Patent No.: US 6,571,402 B1
(45) Date of Patent: Jun. 3, 2003

(54) HITCH MOUNTED PORTABLE TOILET SEAT

(76) Inventor: Frank J. Dobron, 8320 W. Ryan Rd., Franklin, WI (US) 53132-9520

( * ) Notice: Subject to any disclaimer, the term of this patent is extended or adjusted under 35 U.S.C. 154(b) by 0 days.

(21) Appl. No.: 10/142,346

(22) Filed: May 9, 2002

(51) Int. Cl.$^7$ ................................................. E04H 1/12
(52) U.S. Cl. ........................ 4/460; 4/483; 4/458; 4/449
(58) Field of Search ............................ 4/449, 458, 460, 4/479, 483, 484; 224/518–521, 511

(56) References Cited

U.S. PATENT DOCUMENTS

| | | | | |
|---|---|---|---|---|
| 2,772,420 A | * | 12/1956 | Carter | .......................... 4/342 |
| 3,865,431 A | * | 2/1975 | Zakhi | ...................... 297/217.1 |
| 3,992,727 A | * | 11/1976 | Elkins | ............................. 4/311 |
| 5,881,937 A | * | 3/1999 | Sadler | ......................... 224/509 |
| 6,023,792 A | * | 2/2000 | Croucher et al. | ............... 4/484 |
| 6,081,941 A | * | 7/2000 | Beck, Jr. | ......................... 4/460 |
| 6,125,480 A | * | 10/2000 | Soffar et al. | .................... 4/460 |

* cited by examiner

Primary Examiner—Gregory Huson
Assistant Examiner—Amanda R. Flynn
(74) Attorney, Agent, or Firm—Patterson, Thuente, Skaar & Christensen, LLC

(57) ABSTRACT

A portable toilet seat is attachable to a vehicle mounted hitch receptacle having an elongated square opening. The toilet seat includes a coupling portion configured to be slidably inserted into and supported within the hitch receptacle and a seat portion connected to the coupling portion and comprising a single curvilinear band in the shape of an incomplete oval and defining an open center.

13 Claims, 3 Drawing Sheets

US 6,571,402 B1

HITCH MOUNTED PORTABLE TOILET SEAT

FIELD OF THE INVENTION

The present invention relates to a portable toilet seat, and more particularly, to a portable toilet seat attachable to a hitch receptacle mounted on a vehicle.

BACKGROUND OF THE INVENTION

A common problem experienced by individuals such as hunters, campers or explorers traveling by car in remote areas is the lack of appropriate toilet facilities, or the lack of knowledge regarding the whereabouts of such facilities. A portable toilet seat that can be easily attached to a hitch receptacle mounted on the car is often a desirable solution when toilet facilities cannot otherwise be located. It is also advantageous to have the ability to collect and properly dispose of any human waste.

Several previous hitch mounted portable toilet seats have been described, for example, in U.S. Pat. Nos. 6,023,792; 6,081,941; and 6,125,480. In general, these patents describe toilet seats that are more complex and more difficult to manufacture than is the present invention. For example, U.S. Pat. No. 6,023,792 describes a multipart toilet seat that includes legs which are pivotally attached to a toilet seat frame and includes a mounting assembly with a plurality of inclined slots for selectively varying the height of the toilet above the ground. Furthermore, the toilet seat shown in U.S. Pat. No. 6,125,480 is somewhat cumbersome requiring both an extension member and a seating frame supporting a separate conventional toilet seat. Finally, the toilet seat described in U.S. Pat. No. 6,081,941 is more difficult to manufacture than is the present invention, and describes a toilet seat having a seating surface that is not planar because the seat has a shaft portion (or coupling portion) that extends both vertically above the two separate toilet seat members and also into the open area defined by the toilet seat members. Such a seat would be somewhat uncomfortable in use.

SUMMARY OF THE INVENTION

It is an object of the present invention to provide a portable toilet seat that can be quickly and easily attached to and detached from the trailer hitch of a vehicle and which provides a stable and generally horizontal seating surface able to accommodate individuals of various sizes.

It is another object of this invention to provide a portable toilet seat that is easy and inexpensive to manufacture, requires few parts and little assembly, is lightweight, comfortable, and is easy to use and store.

Other features and advantages of the invention will become apparent to those skilled in the art upon review of the following detailed description, claims, and drawings.

Figure 1:
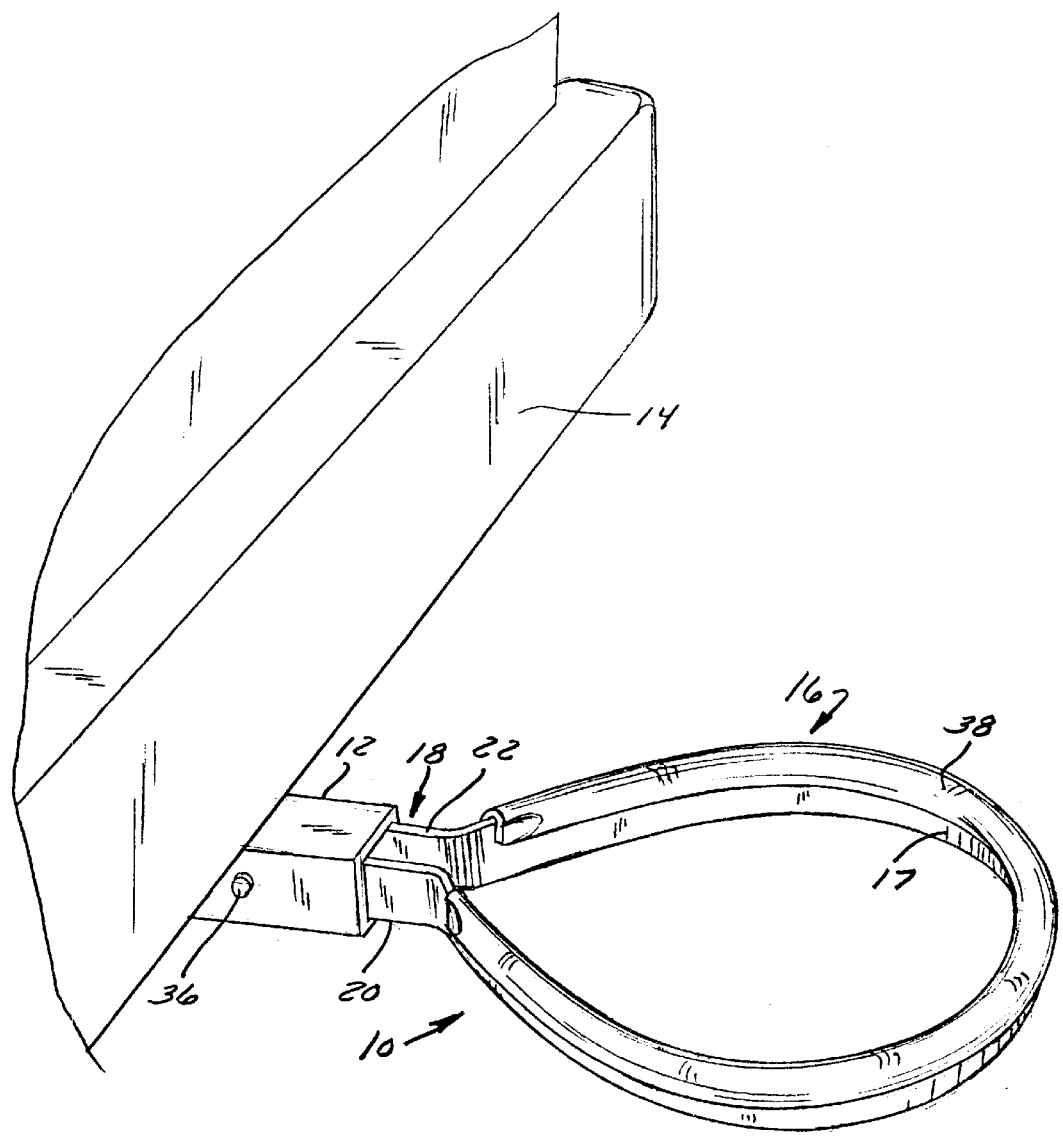
FIG. 1 is a perspective view of the preferred embodiment of the portable toilet seat attached to a hitch receptacle mounted on a vehicle.

Before the embodiments of the invention are explained in detail, it is to be understood that the invention is not limited in its application to the details of construction and the arrangements of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting.

DETAILED DESCRIPTION OF THE INVENTION

Figure 2:
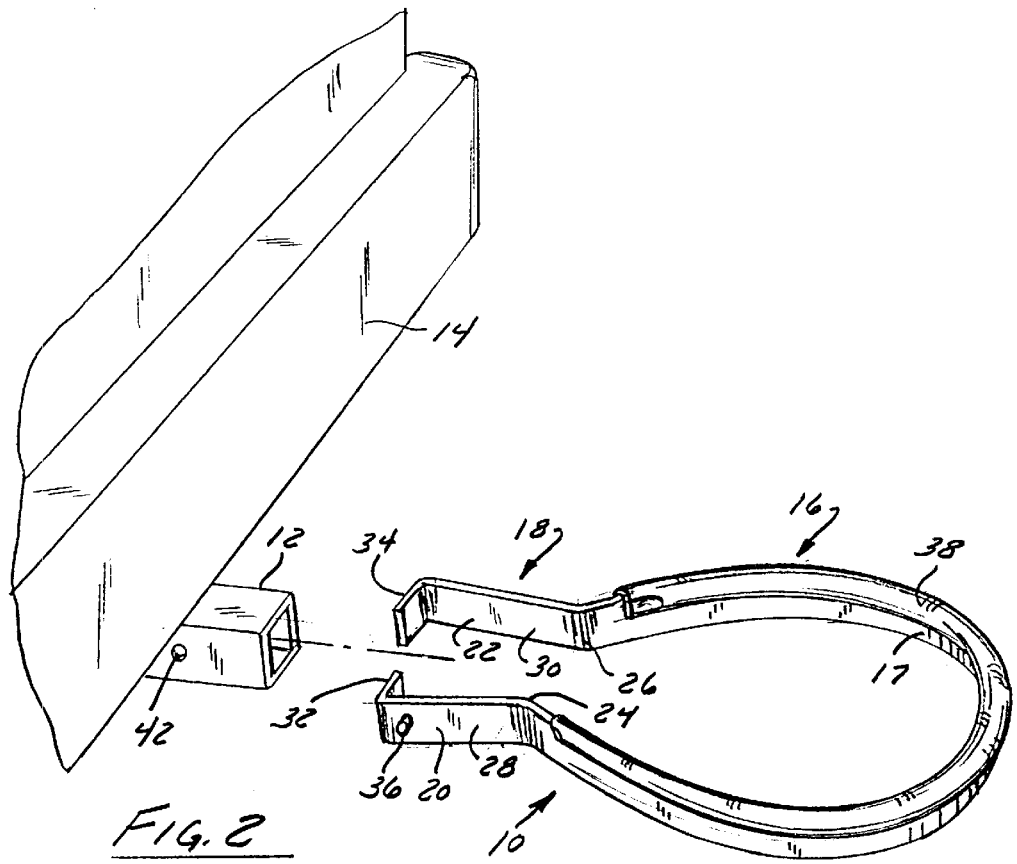
FIG. 2 is a perspective view of the preferred embodiment of the portable toilet seat when the toilet seat is detached from the hitch receptacle and in a relaxed state.

FIGS. 1 and 2 respectively provide perspective views of the preferred embodiment of the present invention when the portable toilet seat 10 is both attached to and detached from a hitch receptacle 12 mounted to a vehicle 14. The hitch receptacle 12 illustrated is a conventional square hitch receptacle having, for example, a 2-inch or a 1¼ inch inner diameter and having an aperture therethrough.

As shown, the portable toilet seat 10 of the preferred embodiment includes a seat portion 16 and a coupling portion 18 that comprise a single band of formed material. The seat portion 16 and the coupling portion 18 are connected in the sense that together they constitute a completed whole. Preferably, the toilet seat 10 is constructed from a single piece of a 2-inch wide metal band having a thickness of ⅛ inch and is designed to attach to a conventional 2-inch inner diameter square hitch receptacle. Alternatively, the toilet seat is constructed from a single piece of a 1¼ inch wide metal band having a thickness of ⅛ inch and is designed to attach to a conventional 1¼ inch inner diameter square hitch receptacle. The seat portion 16 comprises a single curvilinear band 17, constructed substantially in the shape of an incomplete oval and defining an open center. The curvilinear band 17 extends through an arc of at least 270 degrees. As shown in FIG. 1, when the toilet seat 10 is attached to the hitch receptacle 12, the seat portion 16 provides a substantially horizontal seating surface and the coupling portion 18 is at the same height as the seat portion 16.

Figure 3:
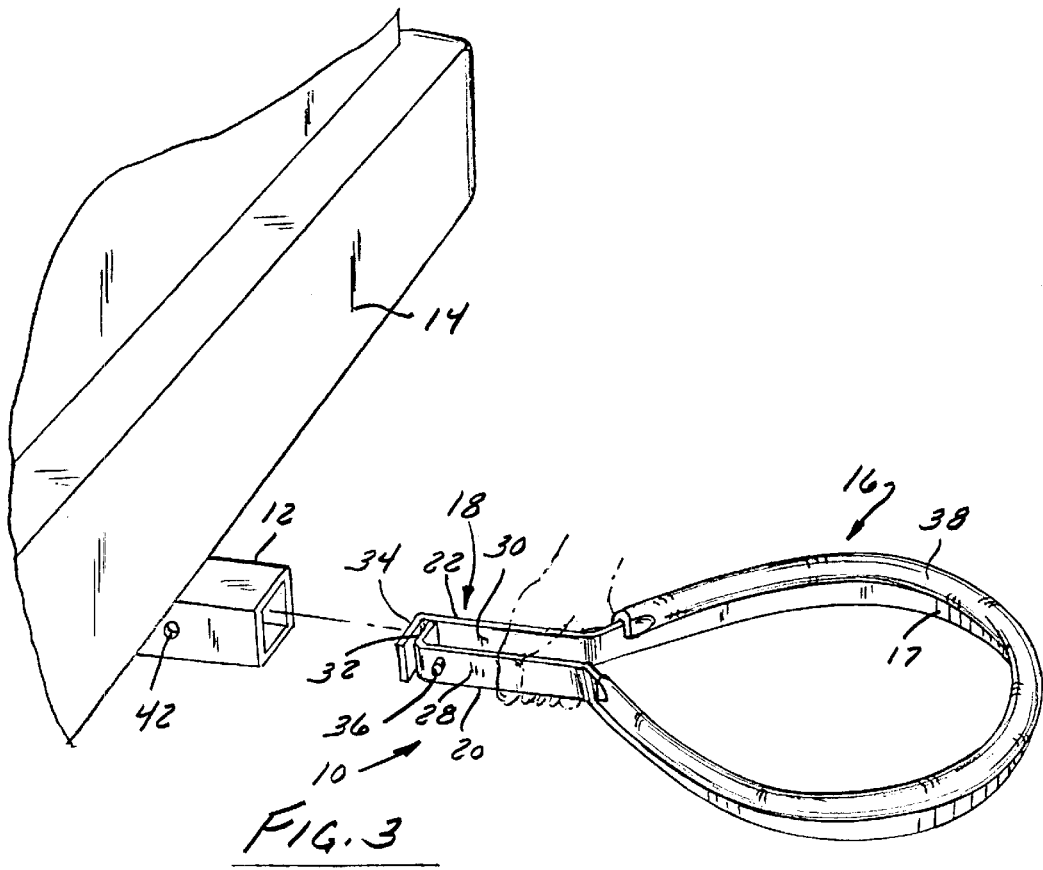
FIG. 3 is a perspective view of the preferred embodiment of the portable toilet seat when the elongated members of the coupling portion are squeezed together for insertion into a hitch receptacle.

The coupling portion 18 of the toilet seat comprises respective arcuate portions 24, 26 for providing a transition to the curvilinear band 17 and two elongated members 20, 22. Elongated members 20, 22 each include a respective body portion 28, 30 and a respective bent end portion 32, 34. Bent end portions 32, 34 are substantially perpendicular to respective body portions 28, 30 and expand their effective thickness and provide stability to the toilet seat 10. More particularly, as shown in FIG. 3, when the coupling portion 18 is inserted into the hitch receptacle 12, bent end portions 32, 34 partially overlap without touching each other, and substantially prevent the seat 10 from twisting or tilting.

Elongated member 20 also includes a protrusion pin, shown here as a plug 36 that extends in the opposite direction from its bent end portion 32 and is meant to engage the aperture 42 of the hitch receptacle 12. In the preferred embodiment, the plug 36 is welded to the elongated member 20.

The toilet seat 10 also includes a cushion member 38 that covers the upper surface of the curvilinear band 17. Preferably, the cushion member 38 is constructed from polymeric tubing or rubber hose that has been slit and then attached by glue to the curvilinear band. The advantages of adding cushion member 38 on top of the curvilinear band include providing a larger and softer surface area on which to sit, as well as providing a surface that is less prone to ambient temperature variations.

As shown in FIG. 2, when the toilet seat 10 is detached from the hitch receptacle 12 and is in a relaxed or unbiased state, the curvilinear band 17 is unflexed and the elongated members 20, 22 are spaced apart a distance that is greater than the inner diameter of the hitch receptacle 12. In order to slidably insert the coupling portion 18 of the toilet seat 10 into the hitch receptacle 12, the user presses the elongated members 20, 22 toward each other as shown in FIG. 3. The user can press either on the coupling portion or the seat portion to do this. In this manner, the curvilinear band 17 is flexed and essentially acts as a spring exerting a force opposite that exerted by the user. When the elongated members 20, 22 are within the hitch receptacle and the user releases the pressure applied to the seat, the body portions 28, 30 spring outward away from each other and are pressed against opposite inner sides of the hitch receptacle 12 such that the body portions 28, 30 are laterally spaced apart and substantially parallel to each other. Further, the plug 36 extends into the aperture 42 of the hitch receptacle, as illustrated in FIG. 1 to secure the toilet seat within the hitch receptacle.

A bag or other collection device such as a conventional garbage bag can be used to collect waste by looping its open end around the seat portion. In this manner, any waste, human or otherwise, can be collected and properly disposed of.

Figure 4:
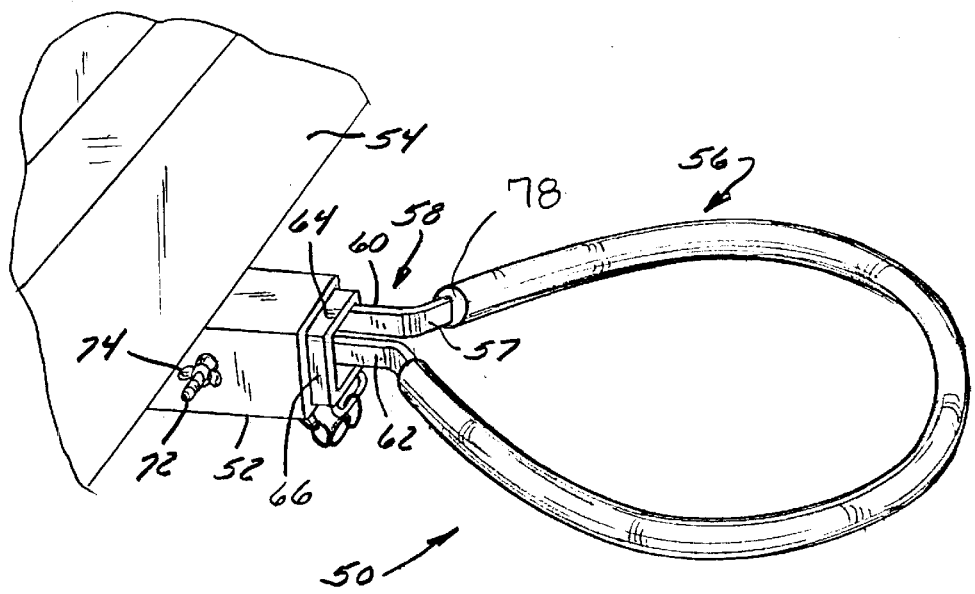
FIG. 4 is a perspective view of a second embodiment of the portable toilet seat attached to a hitch receptacle mounted on a vehicle.
Figure 5:
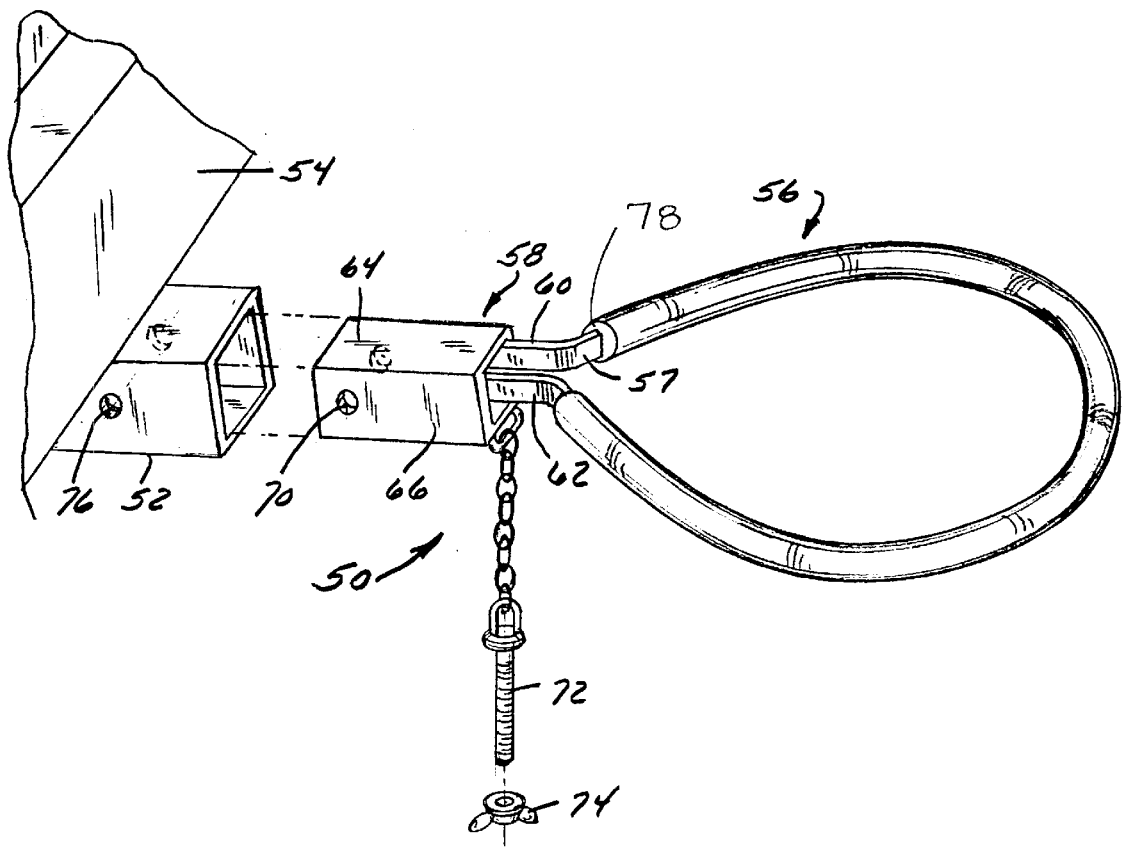
FIG. 5 is a perspective view of the second embodiment of the portable toilet seat when the toilet seat is detached from the trailer hitch.

Illustrated in FIGS. 4 and 5 is a second embodiment of a portable toilet seat. Again, the toilet seat 50 is easily attached to and detached from a conventional hitch receptacle 52 mounted to a vehicle 54.

As shown, the portable toilet seat 50 includes a seat portion 56 and a coupling portion 58. The seat portion 56 comprises a single curvilinear band 57i, constructed substantially in the shape of an incomplete oval and defining an open center. The curvilinear band 57 extends through an arc of at least 270 degrees. As shown in FIG. 4, when the toilet seat 50 is attached to the hitch receptacle 52, the seat portion 56 provides a substantially horizontal seating surface and the coupling portion 58 is at the same height as the seat portion 56. The seat portion 56 is constructed for example out of a standard width metal band. Seat portion 56 also includes end portions 60, 62 that are connected, for example by welding, to the coupling portion 58.

In this embodiment, coupling portion 58 includes a rectangular shaft portion 64 that is suitable for slidably inserting into the hitch receptacle 52. The rectangular shaft portion 64 includes two outside faces 66 (only one shown) parallel and opposite to one another and is preferably constructed from square metal tubing that has been cut to the proper length. Each outside face 66 includes an aperture 70, and the coupling portion 58 includes a chain mounted bolt 72 and a nut 74. In order to secure the toilet seat 50 to the hitch receptacle 52, the rectangular shaft portion 64 is slidably inserted into the hitch receptacle such that for each outside face, aperture 70 aligns with the aperture 76 on the hitch receptacle, and the bolt 72 is placed through the aligned apertures and is secured with nut 74.

The toilet seat 50 also includes a cushion member 78 that covers the upper surface of the curvilinear band 57. Preferably, the cushion member 78 is constructed from polymeric tubing or rubber hose that encircles the curvilinear band 57. The cushion member 78 provides a larger and softer surface area on which to sit. Either version of the cushion member can be used for each embodiment of the toilet seat.

The embodiment illustrated in FIGS. 1–3 is preferred over that illustrated in FIGS. 4 and 5 for several reasons. First, the preferred embodiment is simpler to manufacture because it requires only a single length of metal band and a single weld to attach the plug. The toilet seat is shaped from a standard width of metal band which is available in varying thicknesses, e.g. from 1/16 to 1/2 inch. Additionally, the preferred embodiment is simpler to secure within the hitch receptacle because the plug needs to be aligned with just a single aperture. This is in contrast to having to align two pairs of apertures and inserting a bolt.

The invention has been described as a portable toilet seat. It is to be noted that the invention can also be thought of as a portable support rim useable with a bag collection device to collect other waste. Further, the invention is also useful as a simple support device or chair. Finally, the seat portion need not be curvilinear in shape. For example, other shapes providing the necessary flex force on the elongate members when pressed together and to provide a secure attachment with the hitch receptacle are possible. In this manner, the seat portion can provide support to a table, luggage carrier, or other planar support surface.

Various features of the invention are set forth in the following claims.

What is claimed is:

1. A portable toilet seat attachable to a vehicle mounted hitch receptacle having an elongated square opening, the toilet seat comprising:

a coupling portion configured to be slidably inserted into and supported within the hitch receptacle;

a seat portion comprising a single curvilinear band in the shape of an incomplete oval and defining an open center, said seat portion connected to said coupling portion;

wherein said seat portion and said coupling portion are integral to each other and comprise a single band of formed material; and wherein said coupling portion includes two elongated members that are moved closer to one another in order to slidably insert the toilet seat into the hitch receptacle.

2. The portable toilet seat of claim 1 wherein said seat portion includes a relaxed state and a flexed state and said seat portion is in a flexed state when said two elongated members are moved closer to one another and in said flexed state operate to force said two elongated members apart.

3. The portable toilet seat of claim 2 further including a cushion member supported by said seat portion.

4. The portable toilet seat of claim 3 wherein said cushion member comprises polymeric tubing.

5. The portable toilet seat of claim 4 further comprising a plug connected to one of said elongated members wherein said plug securely engages an aperture in the hitch receptacle.

6. A portable toilet seat attachable to a vehicle mounted hitch receptacle having an elongated square opening, the toilet seat comprising:

a coupling portion including two elongated members disposed laterally side by side and spaced apart from one another that are moveable toward each other in order to be slidably inserted into and supported by the hitch receptacle;

a seat portion that is flexed when said two elongated members are moved toward each other, wherein when said seat portion is flexed, said seat portion exerts a force tending to move said two elongated members apart; and wherein said seat portion and said coupling portion are integrally formed of a single band of material.

7. The portable toilet seat of claim 6 wherein said two elongated members each include a respective body portion and a bent portion substantially perpendicular to said body portion.

8. The portable toilet seat of claim 7 wherein said respective body portions are substantially parallel to each other when said two elongated members are slidably inserted into and supported by the hitch receptacle.

9. The portable toilet seat of claim 6 further comprising a plug connected to one of said two elongated members wherein said plug securely engages an aperture in the hitch receptacle.

10. The portable toilet seat of claim 6 further including a cushion member supported by said seat portion.

11. The portable toilet seat of claim 10 wherein said cushion member comprises polymeric tubing.

12. A method for attaching a portable toilet seat to a vehicle mounted hitch receptacle having an elongated square opening, the method comprising the steps of:

providing a portable toilet seat having a coupling portion and a flexible seat portion integrally formed from a single band of material, wherein the coupling portion includes two horizontally extending elongated members spaced laterally apart from one another;

moving the elongated members toward one another thereby flexing the seat portion such that the seat portion exerts an oppositely directed force on the elongate members;

inserting the elongated members into the elongated square opening to be supported within the hitch receptacle; and releasing said elongated members.

13. The portable toilet seat of claim 12 wherein one of said elongated members further includes a plug and the method includes the step of inserting the elongate members into the elongated square opening until the plug engages an aperture on the hitch receptacle.

* * * * *